United States Patent [19]

Chen

[11] Patent Number: 5,631,951
[45] Date of Patent: May 20, 1997

[54] APPARATUS FOR PREVENTING UNWANTED TELEPHONE CALLS

[76] Inventor: Albert Chen, 17 Corwin Ave., New Hyde Park, N.Y. 11040

[21] Appl. No.: 617,546

[22] Filed: Mar. 19, 1996

[51] Int. Cl.[6] .................................................. H04M 1/64
[52] U.S. Cl. ............................ 379/67; 379/199; 379/189
[58] Field of Search ................................. 379/199, 189, 379/188, 88, 89, 142, 67

[56] References Cited

U.S. PATENT DOCUMENTS

| | | | |
|---|---|---|---|
| 4,006,316 | 2/1977 | Bolgiano | 379/199 |
| 4,242,539 | 12/1980 | Hashimoto | 379/142 |
| 4,266,098 | 5/1981 | Novak | 379/199 |
| 4,937,854 | 6/1990 | Sarakas | 379/199 |

*Primary Examiner*—Krista M. Zele
*Assistant Examiner*—Keith Ferguson

[57] ABSTRACT

An apparatus for preventing unwanted telephone calls adapted to operate in conjunction with a conventional telephone and an associated telephone line. A playback mechanism comprises an integrated circuit adapted to allow the transmission of a message via the telephone line upon the activation thereof for prompting a caller to enter a password. Also included is verification circuitry adapted to accept via the telephone line a first password and further transmit an actuation signal upon the positive verification of the first password with a predetermined second password. Finally, control circuitry is connected to the playback mechanism and verification circuitry. The control circuitry is adapted to activate the playback mechanism and allow the transmission of the message to another party upon the receipt of a call. The control circuitry also accepts the first password and allows communication between the telephone and associated telephone line upon the receipt of the actuation signal from the verification mechanism.

2 Claims, 3 Drawing Sheets

APPARATUS FOR PREVENTING UNWANTED TELEPHONE CALLS

BACKGROUND OF THE INVENTION

1. Field of the Invention

The present invention relates to an apparatus for preventing unwanted telephone calls and more particularly pertains to requiring a password of a party making an incoming call.

2. Description of the Prior Art

The use of telephone screening devices is known in the prior art. More specifically, telephone screening devices heretofore devised and utilized for the purpose of precluding unwanted calls are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,351,289 to Logsdon et al. a caller ID telephone security device for automatically controlling the application of a power ring signal of an incoming call generated by a telephone company. U.S. Pat. No. 5,228,080 to Nutter et al. discloses a method and apparatus for causing certain predetermined telephone actions to take place when a predetermined code is entered. U.S. Pat. No. 5,036,534 to Gural discloses a subscriber interface which enables the connection of otherwise incompatible telephone device systems to interact on a single telephone line. U.S. Pat. No. 5,151,930 to Hagl and U.S. Pat. No. 5,138,652 to Hashimoto are provided as being of general interest.

In this respect, the apparatus for preventing unwanted telephone calls according to the present invention substantially departs from the conventional concepts and designs of the prior art, and in so doing provides an apparatus primarily developed for the purpose of requiring a password of a party making an incoming call.

Therefore, it can be appreciated that there exists a continuing need for a new and improved apparatus for preventing unwanted telephone calls which can be used for requiring a password of a party making an incoming call. In this regard, the present invention substantially fulfills this need.

SUMMARY OF THE INVENTION

In view of the foregoing disadvantages inherent in the known types of telephone screening devices now present in the prior art, the present invention provides an improved apparatus for preventing unwanted telephone calls. As such, the general purpose of the present invention, which will be described subsequently in greater detail, is to provide a new and improved apparatus for preventing unwanted telephone calls which has all the advantages of the prior art and none of the disadvantages.

To attain this, the present invention essentially comprises a housing having a front face, a rear face, a top surface, a bottom surface, and a pair of side faces formed therebetween defining an interior space. The housing has an input jack situated on the rear face of the housing. The input jack may be selectively connected to a conventional telephone Jack. The housing further has an output Jack situated on the rear face thereof which is adapted to be releasably coupled to a telephone output line which is, in turn, connected to a conventional telephone. With reference to FIG. 5, an encoder is situated within the interior space of the housing with a single input line, four output lines, and a clock. The encoder is adapted to generate a four digit binary representation of an analog signal upon the receipt thereof via the input line. Such analog signal is indicative of a first single decimal digit. The encoder is further adapted to generate a clock pulse upon the transmission of the binary representation of the analog signal on to the four output lines. Also included is state memory situated within the interior space of the housing having four input lines, four output lines, and a clock input line. The input lines are connected to corresponding output lines of the encoder. The clock input line is coupled to the clock of the encoder. The state memory is adapted to maintain the state of each of the output lines thereof identical to those of the encoder upon the receipt of a clock pulse. Password circuitry is included with a light emitting diode digital display positioned on the top surface of the housing, selection button, and four output lines. The password circuitry allows a user to select a second decimal digit with the selection button and further depict the decimal digit via the display. The password circuitry is adapted to further maintain a binary representation of the second decimal digit on the four output lines thereof. As shown in FIG. 5, digital comparator circuitry comprises four exclusive-NOR gates each having inputs coupled to corresponding output lines of both the state memory and password circuitry. The digital comparator circuitry is adapted to produce an active state on the output of each gate upon the matching of the output lines of the state memory and the output lines of the password circuitry. Switching circuitry is situated within the interior space of the housing and is connected to the input jack, output jack, and the output lines of the comparator memory. The switching mechanism allows communication between the input jack and output jack upon the activation thereof. Activation of the switch mechanism is effected by all of the output lines of the comparator memory being of an active state. Also positioned within the interior space of the housing is a playback mechanism composing of an integrated circuit. The playback mechanism affords the digital recording of a brief prompting message thereon and further allows the playback of such message upon the activation thereof. Finally, control circuitry is situated within the interior space of the housing and is connected to the playback mechanism, output jack, and the input line of the encoder. The control circuitry, in a first mode of operation, is adapted to activate the playback mechanism and allow the transmission of the message to another party via the output jack upon the receipt of a call. Also in the first mode of operation, the control circuitry allows the transmission to the encoder of an analog signal generated by the depression of a digit on a phone of the other party. Subsequently, the control circuitry affords ringing of the telephone of the user upon the activation of the switching circuitry. Communication between the input jack and the output jack is thus provided upon the receipt of a proper single digit password. In a second mode of operation, the control circuitry is adapted to allow conventional use of the telephone. The control circuitry also unconditionally precludes communication between the input jack and output jack of the housing in a third mode of operation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus for preventing unwanted telephone calls which has all the advantages of the prior art telephone screening devices and none of the disadvantages.

It is another object of the present invention to provide a new and improved apparatus for preventing unwanted telephone calls which may be easily and efficiently manufactured and marketed.

It is a further object of the present invention to provide a new and improved apparatus for preventing unwanted telephone calls which is of a durable and reliable construction.

An even further object of the present invention is to provide a new and improved apparatus for preventing unwanted telephone calls which is susceptible of a low cost of manufacture with regard to both materials and labor, and which accordingly is then susceptible of low prices of sale to the consuming public, thereby making such apparatus for preventing unwanted telephone calls economically available to the buying public.

Still yet another object of the present invention is to provide a new and improved apparatus for preventing unwanted telephone calls which provides in the apparatuses and methods of the prior art some of the advantages thereof, while simultaneously overcoming some of the disadvantages normally associated therewith.

Still another object of the present invention is to require a password of a party making an incoming call.

Lastly, it is an object of the present invention to provide a new and improved apparatus for preventing unwanted telephone calls adapted to operate in conjunction with a conventional telephone and an associated telephone line. A playback mechanism comprises an integrated circuit adapted to allow the transmission of a message via the telephone line upon the activation thereof for prompting a caller to enter a password. Also included is verification circuitry adapted to accept via the telephone line a first password and further transmit an actuation signal upon the positive verification of the first password with a predetermined second password. Finally, control circuitry is connected to the playback mechanism and verification circuitry. The control circuitry is adapted to activate the playback mechanism and allow the transmission of the message to another party upon the receipt of a call. The control circuitry also accepts the first password and allows communication between the telephone and associated telephone line upon the receipt of the actuation signal from the verification mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
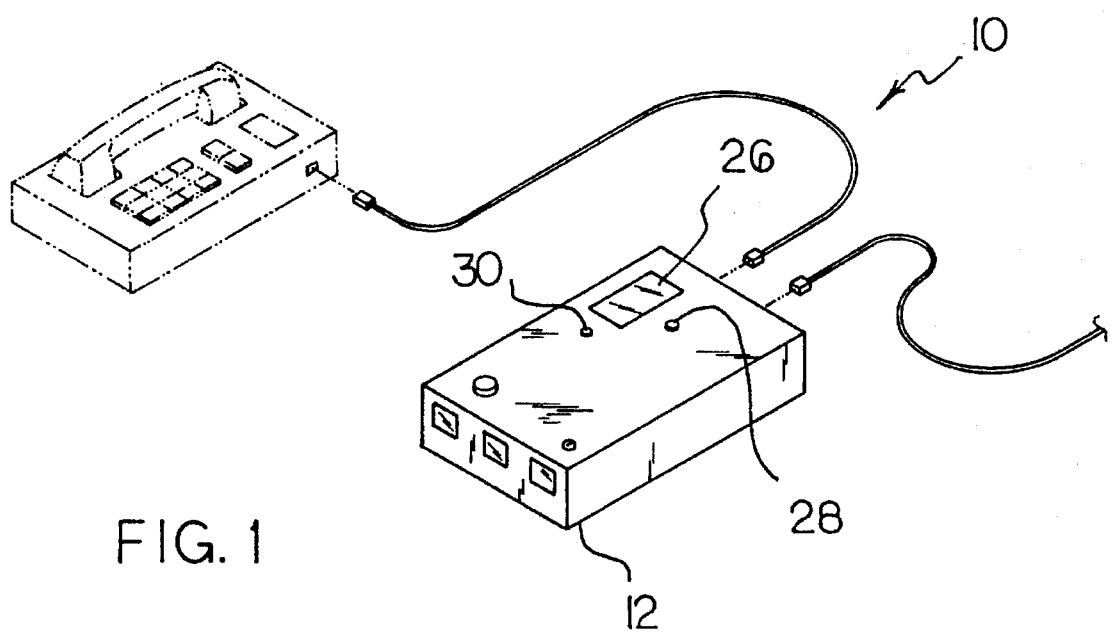
FIG. 1 is a perspective illustration of the preferred embodiment of the apparatus for preventing unwanted telephone calls constructed in accordance with the principles of the present invention.
Figure 2:
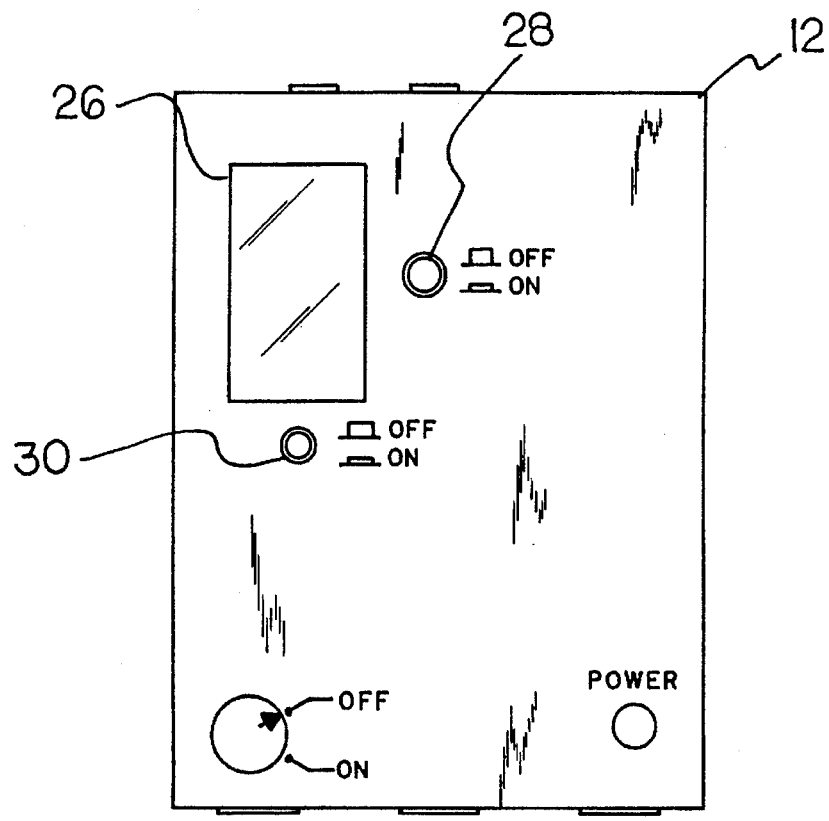
FIG. 2 is a top elevational view of the present invention.
Figure 3:
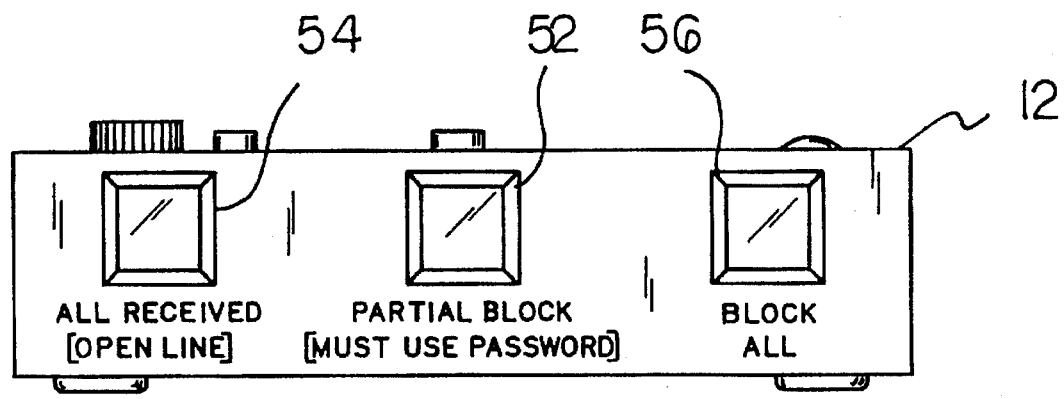
FIG. 3 is a front plan view of the present invention.
Figure 4:
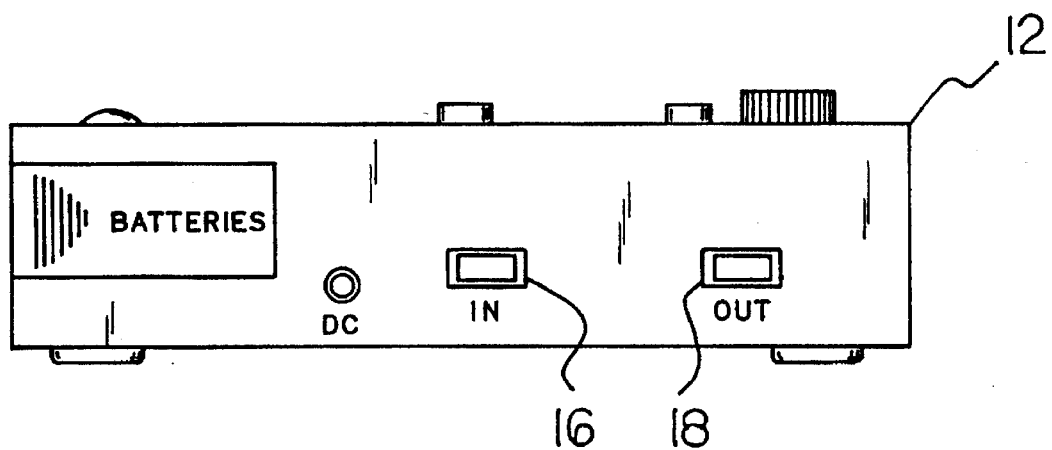
FIG. 4 is a rear plan view of the present invention.

With reference now to the drawings, and in particular to FIG. 1 thereof, a new and improved apparatus for preventing unwanted telephone calls embodying the principles and concepts of the present invention and generally designated by the reference numeral 10 will be described.

The present invention, the new and improved apparatus for preventing unwanted telephone calls, is comprised of a plurality of components. Such components in their broadest context include a housing, encoder, state memory, password circuitry, switch mechanism, playback mechanism, and control housing. Such components are individually configured and correlated with respect to each other so as to attain the desired objective.

More specifically, it will be noted that the system 10 of the present invention includes a housing 12 having a front face, a rear face, a top surface, a bottom surface, and a pair of side faces formed therebetween defining an interior space. Preferably, the housing has a length of approximately 10 cm, height of approximately 5 cm, and a width of approximately 10 cm. The housing has an input jack 16 situated on the rear face of the housing. The input jack may be selectively connected to a conventional telephone jack. The housing further has an output jack 18 situated on the rear face thereof which is adapted to be releasably coupled to a telephone output line which is, in turn, connected to a conventional telephone.

Figure 5:
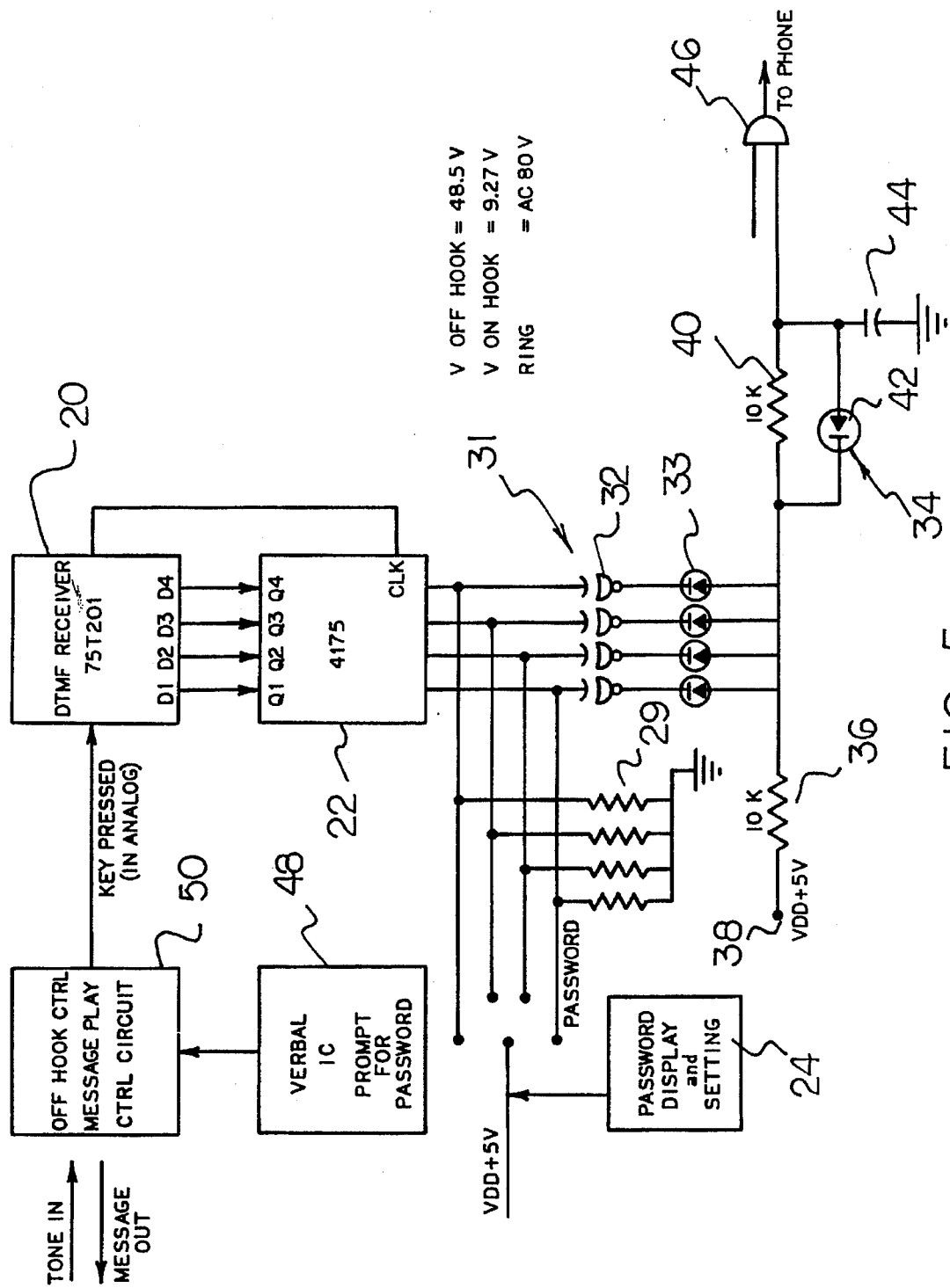
FIG. 5 is a schematic diagram showing the interconnection of the electrical components employed in the present invention.

With reference to FIG. 5, an encoder 20 is situated within the interior space of the housing with a single input line, four output lines, and a clock. Ideally, a DTMF receiver (75T201) is employed for use as the encoder. The encoder is adapted to generate a four-digit binary representation of an analog signal upon the receipt thereof via the input line. Such analog signal is indicative of a first single decimal digit. The encoder is further adapted to generate a clock pulse upon the transmission of the binary representation of the analog signal on to the four output lines.

Also included is state memory 22 (model 4175) situated within the interior space of the housing having four input lines, four output lines, and a clock input line. The input lines are connected to corresponding output lines of the encoder. The clock input line is coupled to the clock of the encoder. The state memory is adapted to maintain the state of each of the output lines thereof identical to those of the encoder upon the receipt of a clock pulse.

Password circuitry 24 is included with a light emitting diode digital display 26 positioned on the top surface of the housing, selection button 28, and four output lines. A damping resistor 29 is connected between each output line of the password circuitry and ground for limiting the output thereof. The password circuitry allows a user to select a second decimal digit with the selection button and further depict the decimal digit via the display. Selection is achieved by subsequently depressing the selection button until a desired one digit decimal code is shown on the display. For providing secrecy, a display disabling button 30 is included that allows the selective deactivation of the display. The password circuitry is adapted to further maintain a binary representation of the second decimal digit on the four output lines thereof. As an option, a two-digit password and display may be utilized to provide additional security. In such an embodiment, a total of sixteen different combinations is provided with still four output lines. With the addition of another output line, a total of thirty-two combinations is available.

As shown in FIG. 5, digital comparator circuitry 31 comprises four exclusive-NOR gates 32 each having inputs coupled to corresponding output lines of both the state memory and password circuitry. The digital comparator circuitry is adapted to produce an active state on the output of each gate upon the matching of the output lines of the state memory and the output lines of the password circuitry. For protecting the gates, a diode 33 is included on the output of each gate with the cathode thereof coupled thereto.

Switching circuitry 34 is situated within the interior space of the housing and is connected to the input jack, output jack, and the output lines of the comparator memory. A resistor 36 is connected between the output lines of the comparator circuitry and a voltage bus 38. Another resistor 40 with a parallel coupled diode 42 is also connected to the output lines of the comparator circuitry. A capacitor 44 is connected between the anode of the diode and ground. Finally, an AND gate 46 has a first input coupled to the capacitor and an output connected to the output jack of the housing. The switching mechanism allows communication between the input jack and output Jack upon the activation thereof. Activation of the switch mechanism is effected by all of the output lines of the comparator memory being of an active state.

Also positioned within the interior space of the housing is a playback mechanism 48 comprising of an integrated circuit. The playback mechanism affords the digital recording of a brief prompting message thereon and further allows the playback of such message upon the activation thereof.

Finally, control circuitry 50 is situated within the interior space of the housing and is connected to the playback mechanism, output jack, and the input line of the encoder. The control circuitry, in a first mode of operation, is adapted to activate the playback mechanism and allow the transmission of the message to another party via the output jack upon the receipt of a call. Also in the first mode of operation, the control circuitry allows the transmission to the encoder of an analog signal generated by the depression of a digit on a phone of the other party. Subsequently, the control circuitry affords ringing of the telephone of the user upon the activation of the switching circuitry. Communication between the input jack and the output jack is thus provided upon the receipt of a proper single digit password. In a second mode of operation, the control circuitry is adapted to allow conventional use of the telephone. The control circuitry also unconditionally precludes communication between the input jack and output jack of the housing in a third mode of operation. Powering of the device is achieved by using a direct current adapter, batteries, or a combination thereof.

Selection of the mode of operation of the present invention is accomplished using three selection keys situated on the front face of the housing. A partial block key 52 actuates the present invention in the first mode of operation. An open line key 54 is included to allow actuation of the present invention in the second mode of operation. Lastly, a block all key 56 allows the operation of the invention is the third mode.

During use in the first mode of operation, a second party may call the telephone of the present invention. Upon receipt of a conventional tone associated with an incoming call, the present invention precludes ringing of the telephone thereof and automatically provides the prompting message to the other party. Upon being prompted, the other party may depress a key on the telephone representative of a single digit password. The control circuitry only allows the entering of a single password. If positive verification is not obtained with a single attempt, the present invention automatically disconnects the line. The present invention may also be equipped with circuitry for precluding more than a predetermined amount of attempts at positive verification. Once positive verification is achieved, the present invention rings the telephone thereof. The apparatus for preventing unwanted telephone calls thus provides a unique method of preventing unwanted incoming calls.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for preventing unwanted telephone calls comprising, in combination:

a housing having a front face, a rear face, a top surface, a bottom surface, and a pair of side faces formed therebetween defining an interior space, the housing having an input jack situated on the rear face of the housing and selectively connected to a conventional telephone jack, the housing further having an output jack situated on the rear face thereof and adapted to be releasably coupled to a telephone output line connected to a conventional telephone;

an encoder situated within the interior space of the housing and comprising a single input line, four output lines, and a clock, the encoder adapted to generate a four-digit binary representation of an analog signal indicative of a first single decimal digit upon the receipt thereof via the input line, the encoder further adapted to generate a clock pulse upon the transmission of the binary representation of the analog signal on to the four output lines;

state memory situated within the interior space of the housing and comprising four input lines, four output lines, and a clock input line, the input lines connected to corresponding output lines of the encoder and the clock input line connected to the clock of the encoder, whereby the state memory is adapted to maintain the state of each of the output lines thereof identical to those of the encoder upon the receipt of a clock pulse;

password circuitry including a light emitting diode digital display positioned on the top surface of the housing, selection means, and four output lines, the password circuitry allowing a user to select a second decimal digit with the selection means and depict the decimal digit via the display, the password circuitry is adapted to further maintain a binary representation of the second decimal digit on the four output lines thereof;

digital comparator circuitry comprising four exclusive-NOR gates each having inputs coupled to corresponding output lines of both the state memory and password circuitry, the digital comparator circuitry adapted to produce an active state on the output of each gate upon the matching of the output lines of the state memory and the output lines of the password circuitry;

switching means situated within the interior space of the housing and connected to the input jack, output jack, and the output lines of the comparator memory, the switching means adapted to allow communication between the input jack and output jack upon the activation thereof effected by all of the output lines of the comparator memory being of an active state;

playback means comprising an integrated circuit adapted to allow the digital recording of a brief prompting message thereon and further allow the playback of such message upon the activation thereof; and control circuitry situated within the interior space of the housing and connected to the playback means, output jack, and the input line of the encoder, the control circuitry, in a first mode of operation, adapted to activate the playback means and allow the transmission of the message to another party via the output jack upon the receipt of a call, to allow the transmission to the encoder of an analog signal generated by the depression of a digit on a phone of the other party, and afford ringing of the telephone of the user upon the activation of the switching means, thereby allowing communication between the input jack and the output jack upon the receipt of a proper single digit password, the control circuitry adapted to allow conventional use of the telephone in a second mode of operation and further unconditionally preclude communication between the input jack and output jack of the housing in a third mode of operation.

2. An apparatus for preventing unwanted telephone calls comprising:

a conventional telephone and an associated telephone line;

an encoder comprising a single input line, four output lines, and a clock, the encoder adapted to generate a four-digit binary representation of an analog signal indicative of a first signal decimal digit upon the receipt thereof via the input line, the encoder further adapted to generate a clock pulse upon the transmission of the binary representation of the analog signal on to the four output lines;

state memory comprising four input lines four output lines, and a clock input line, the input lines connected to corresponding output lines of the encoder and the clock input line connected to the clock of the encoder, whereby the state memory is adapted to maintain the state of each of the output lines thereof identical to those of the encoder upon the receipt of a clock pulse;

password circuitry including a light emitting diode digital display, selection means, and four output lines, the password circuitry allowing a user to select a second decimal digit with the selection means and depict the decimal digit via the display, the password circuitry is adapted to further maintain a binary representation of the second decimal digital on the four output lines thereof;

digital comparator circuitry comprising four exclusive-NOR gates each having inputs coupled to corresponding output lines of both the state memory and password circuitry the digital comparator circuitry adapted to produce an active state on output of each gate upon the matching of the output lines of the state memory and the output lines of the password circuitry; and switching means connected to the telephone, telephone line, and the output lines of the comparator memory, the switching means adapted to allow communication between the telephone line and telephone upon the activation thereof effected by all of the output lines of the comparator memory being of an active state;

playback means adapted to allow the transmission of a message via the telephone line upon the activation thereof; and control circuitry connected to the playback means, the telephone line, the telephone, and the input line of the encoder, the control circuitry adapted to activate the playback means and allow the transmission of the message to another party via the telephone line upon the receipt of a call, to allow the transmission to the encoder an analog signal generated by the depression of a digit on a phone of the other party, and afford ringing of the telephone of the user upon the activation of the switching means, thereby allowing communication between the telephone and the telephone line upon the receipt of a proper single digit password.

* * * * *